United States Patent [19]

Semple

[11] Patent Number: 5,016,935
[45] Date of Patent: May 21, 1991

[54] COLLAPSIBLE CAP FOR A PICKUP TRUCK BOX

[76] Inventor: James S. Semple, 784 Leicester Rd., Elk Grove Village, Ill. 60007

[21] Appl. No.: 112,617

[22] Filed: Oct. 26, 1987

[51] Int. Cl.$^5$ ................................................. B60P 3/34
[52] U.S. Cl. ........................................ 296/26; 296/27; 296/100; 296/165; 296/167
[58] Field of Search ............... 296/26, 27, 100, 165, 296/167, 173, 105, 10, 31 P

[56] References Cited

U.S. PATENT DOCUMENTS

| | | | |
|---|---|---|---|
| 2,626,832 | 1/1953 | Guthoerl | 296/173 |
| 2,686,075 | 8/1954 | Steiner | 296/173 |
| 3,097,013 | 7/1963 | Mussler | 296/27 X |
| 3,175,857 | 3/1965 | Lewis | 296/164 |
| 3,219,383 | 11/1965 | Nerem | 296/165 |
| 3,304,668 | 2/1967 | Edmonds | 296/173 X |
| 3,357,693 | 12/1967 | Mitas | 296/165 X |
| 3,394,961 | 7/1968 | Matte | 296/67 |
| 3,536,352 | 10/1970 | Beckley | 296/100 X |
| 3,712,005 | 1/1973 | Eschbach et al. | 52/210 |
| 3,768,858 | 10/1973 | Boismier | 296/100 |
| 3,955,845 | 5/1976 | Werner | 296/10 |
| 3,995,890 | 12/1976 | Fletcher | 296/10 |
| 4,024,592 | 5/1977 | Schlagenhauf | 114/344 |
| 4,294,484 | 10/1981 | Robertson | 296/156 |
| 4,351,558 | 9/1982 | Mueller | 296/31 P X |
| 4,542,911 | 9/1985 | Mulligan | 296/27 |
| 4,542,933 | 9/1985 | Bischoff | 296/164 |
| 4,627,655 | 12/1986 | Collins | 296/164 X |

FOREIGN PATENT DOCUMENTS

| | | | |
|---|---|---|---|
| 160904 | 7/1943 | Fed. Rep. of Germany | 296/31 P |
| 2360459 | 4/1978 | France | 296/31 P |
| 965860 | 8/1964 | United Kingdom | 296/26 |
| 1209714 | 10/1970 | United Kingdom | 296/31 P |
| 1280222 | 7/1972 | United Kingdom | 296/27 |

*Primary Examiner*—Dennis H. Pedder
*Attorney, Agent, or Firm*—Lloyd L. Zickert

[57] ABSTRACT

A collapsible cap for a pickup truck box having separable front, back and intermediate panel members that sealingly connect along joints by releasable fasteners that may be operated by hand without the need of tools. The intermediate panel members are hinged and form side and top panel portions of the cap which are relatively pivotable whereby the top panel portions may be extended in a coplanar relation to said side panel portions to be storable in a flattened arrangement. Extruded connector strips with sealing gaskets extend along edges of the panel members for tight engagement between the pickup truck box and the cap and at joints between the collapsible cap panel members themselves. Manually operable releasable fasteners connect the cap to the box.

12 Claims, 3 Drawing Sheets

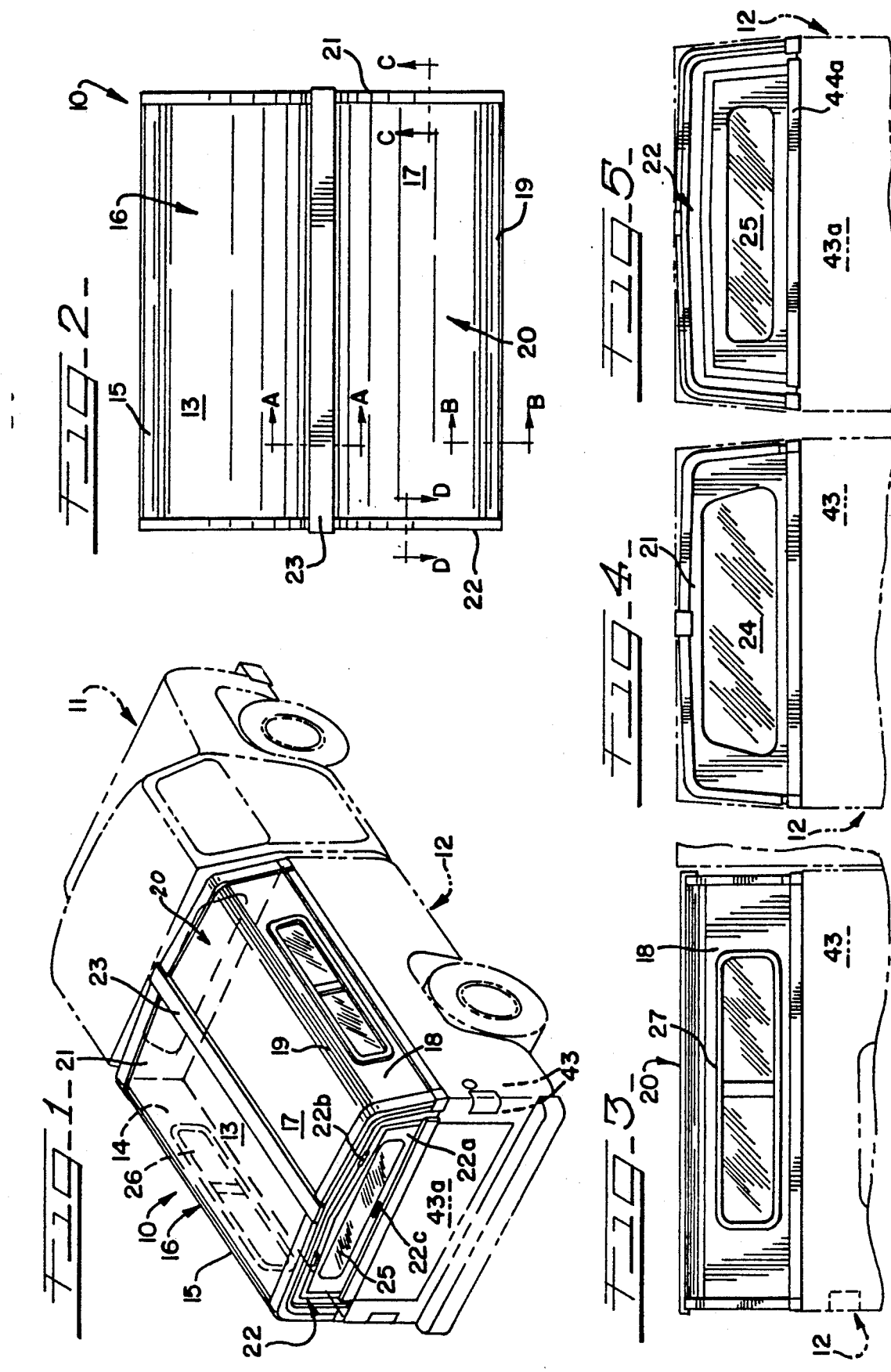

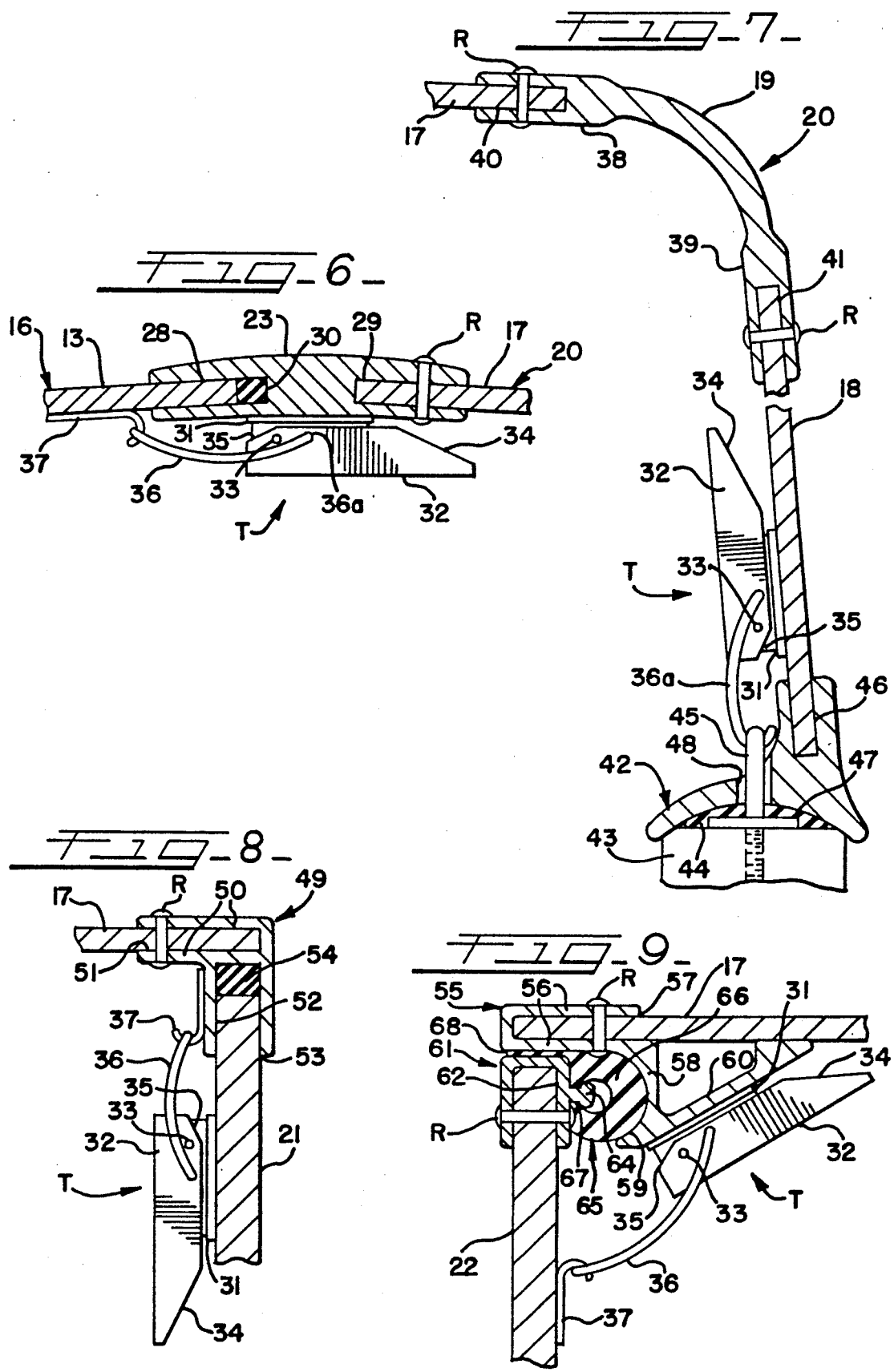

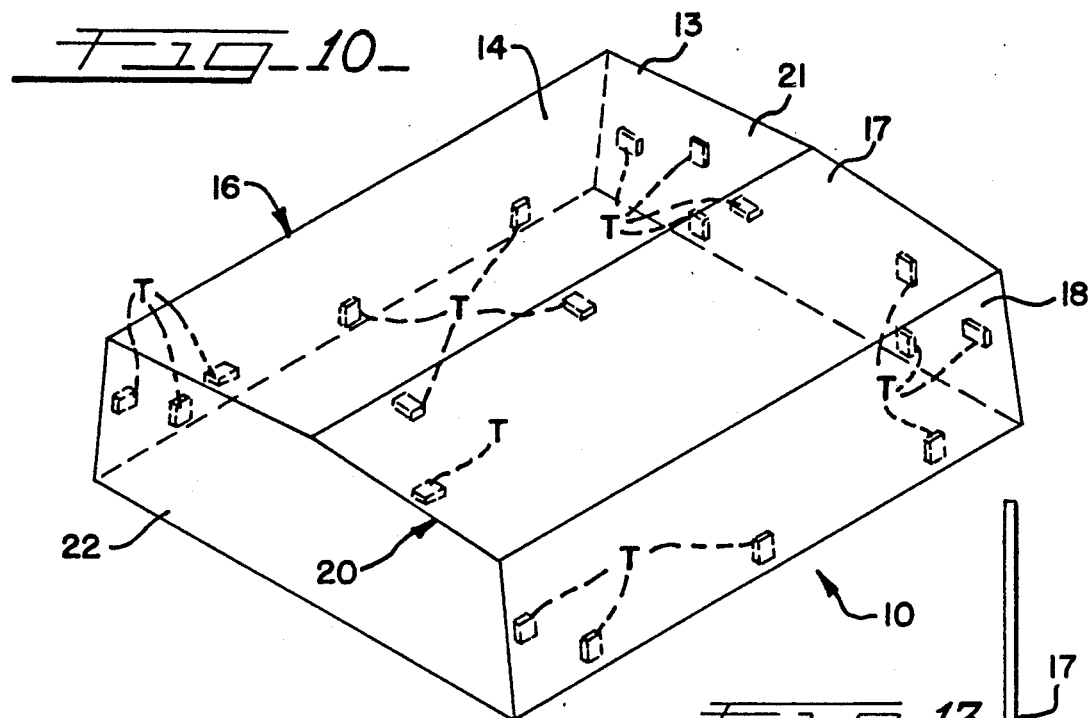
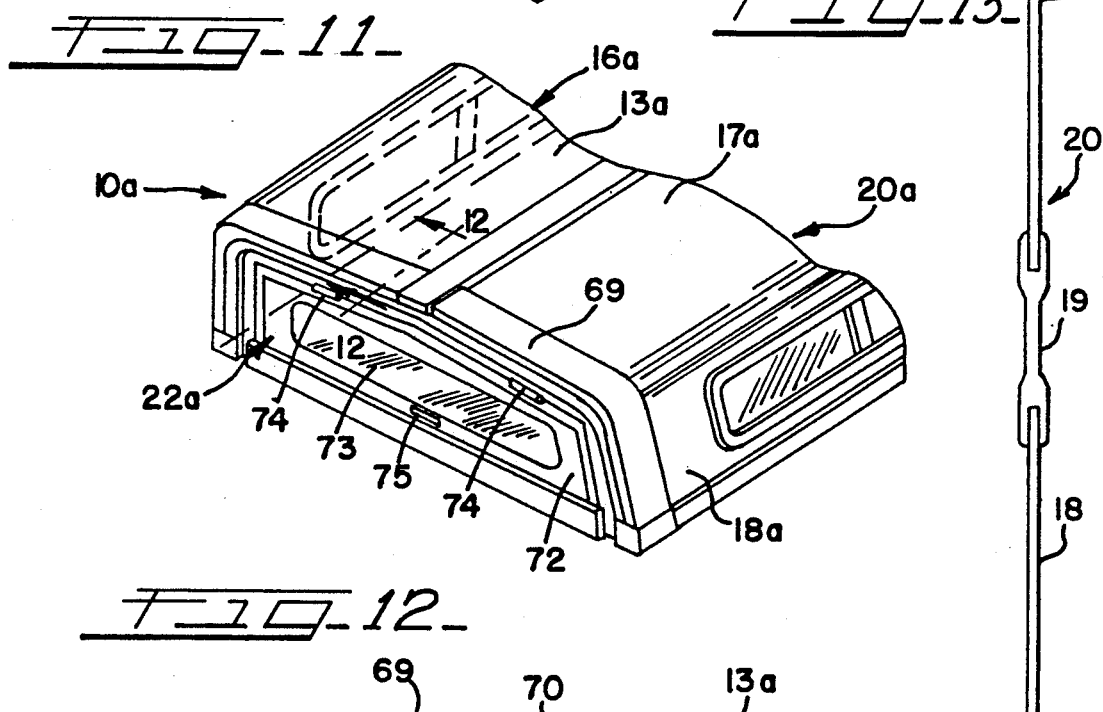
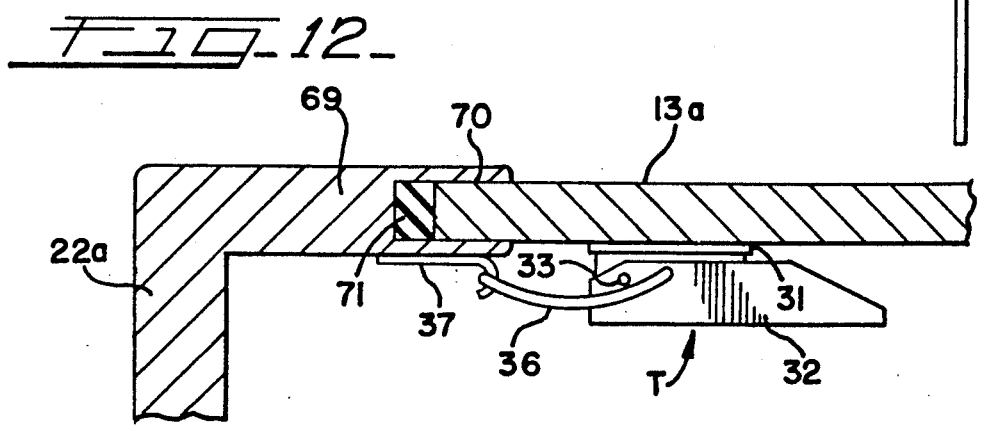

COLLAPSIBLE CAP FOR A PICKUP TRUCK BOX

DESCRIPTION

The invention generally relates to a cap for the box of a pickup truck. More specifically, the invention is directed toward a collapsible cap which may be assembled on the box of the pickup truck by one person without the use of tools.

BACKGROUND OF THE INVENTION

In the past, pickup trucks have been usually provided with one-piece caps for covering the bed and box. Usually, these caps were bulky and required at least two people to lift them on and off the truck.

Also, most presently used caps for pickup truck boxes are not collapsible and therefore require a sufficient amount of storage space when not in use on the truck. Many of these prior art pickup truck caps require tools for their attachment.

Folding and collapsible caps have been provided in the past but generally they require a large number of components and time consuming assembly procedures. Usually more than one person is required to mount such caps on a truck box, and tools are needed to handle fasteners.

Inherently, when a collapsible or foldable design is considered, weatherproofing joints, or foldable hinges, between the cap components is a concern of the industry so that the cap may be tightly sealed to prevent the intrusion of water and protect cargo carried within the box. Thus, the problem of providing a desirably foldable or collapsible cap is compounded by the necessity for providing weathertight sealing means for the joints and seams of such a structure.

SUMMARY OF THE INVENTION

The invention may be summarized as providing a cap with top, side, front and rear panels wherein transverse front and rear panel members are joined therebetween by a pair of unitary hinged panel members in which each hinged panel member forms a full side panel and one half of the top panel of the cap. The four panel members are joined at seams therebetween by sealing gaskets and the top portions of the hinged panel members meet generally along the center line of the cap at a sealing connector strip, which may be of an extruded plastic or metal, such as aluminum. Further, the attachments of the panel members to each other, and to upper edges of the pickup truck box, are provided by complementary fasteners carried both on the panel members and sidewalls of the box, which may be simply fastened together by hand to releasably secure the panel members to each other and to the box without the use of tools. The top and side panel portions of the hinged panel members are joined at a flexible hinge to enable the hinged panel members to be moved to a flat configuration for easy storage. The front and rear panel members are generally flat and may then be stored adjacent the hinged panel members so that the entire collapsible cap offers convenient disassembly and requires very little space for storage.

Extruded connector strips may be provided at all joints between the cap panel members, and between the cap and the truck sidewalls, including compressible seals for a weathertight snug fit therebetween.

Accordingly, it is a primary goal of the invention to provide a collapsible cap for a pickup truck box which can be assembled by one person.

It is another important object of the invention to provide a collapsible cap which requires no tools for the assembly on the pickup truck box and which includes cooperative fasteners that may be permanently premounted to the box and to the cap.

It is a concomitant goal of the invention to provide a minimum amount of components, preferably four separable constituent panel parts, which may be easily stored in a flattened arrangement when not in use.

It is an allied goal of the invention to provide seals and gasket means for the joints between the components of the cap which are weathertight and which allow for a snug tightened fitting of the cap to the truck box to prevent rattles.

It is further the object of the invention to provide a collapsible cap which may include conventional windows at the front and back of the cap as well as the sides.

BRIEF DESCRIPTION OF THE DRAWINGS

FIG. 1 is a perspective view of the collapsible cap of the invention shown mounted to the box of a pickup truck;

FIG. 2 is a top plan view of the collapsible cap;

FIG. 3 is a side view of the collapsible cap;

FIG. 4 is a front view of the collapsible cap;

FIG. 5 is a rear view of the collapsible cap;

FIG. 6 is a sectional view of the collapsible cap taken along line A—A of FIG. 2 and showing the center seam joint connection of the top panels of the collapsible cap;

FIG. 7 is a sectional view taken along line B—B of FIG. 2 showing a hinged panel member having a side portion and a top portion, and the attachment of the hinged panel member to the pickup truck box sidewall;

FIG. 8 is a sectional view taken along line C—C of FIG. 2 showing the typical connection between the front panel member and hinged panel members;

FIG. 9 is a sectional view taken along line D—D of FIG. 2 showing the typical connection between the rear panel member and the hinged panel members;

FIG. 10 is a perspective schematic view of the collapsible cap showing the location of the locking clamps for securing the four panel members together and for the attachment of the cap to the pickup truck box;

FIG. 11 is a perspective partial view of an alternate embodiment of the collapsible cap viewing the rear half thereof;

FIG. 12 is a sectional view of the alternate embodiment of FIG. 11 taken along line 12—12 illustrating a modification to the connection between the rear panel member and the rear edge of a hinged panel member; and, FIG. 13 is a somewhat schematic view of the hinged panel member shown in elevation to illustrate top and side panel portions in coplanar position for storage purposes.

DESCRIPTION OF THE INVENTION

The invention will be described in connection with a preferred embodiment, but it will be understood that it is not intended to limit the invention to that embodiment. Instead, it is intended to cover all alternatives, equivalents and modifications as may be included within the spirit and scope of the invention as defined by the appended claims.

Turning first to FIG. 1, the invention will be seen to comprise, in preferred form, a collapsible cap 10 that is releasably fastened to a pickup truck 11, shown in phantom lines, and having a standard box 12 behind the cab for storage and cargo transport purposes. The collapsible cap 10 can be made for variously sized pickup truck boxes and accordingly there is no limitation as to the length, width and height of the cap 10 as would be understood. It is the intended purpose to provide for the collapsible cap 10 to be releasably fastened to the box 12 by one person in an easy-to-assemble or disassemble procedure requiring no tools.

The collapsible cap 10 includes a top left half panel 13 and a left side panel 14 that is connected to the panel 13 by a flexible hinge 15 whereby they form a unitary hinged panel member 16 covering the left half of the box 12.

Similarly, at the right side above the box 12, a top right half panel 17 is connected to a right side panel 18 by a flexible hinge 19 whereby the panels 17 and 18 form a unitary hinged panel member 20 covering the right half of the box 12. At the forward end of the box 12, the collapsible cap 10 includes a front panel member 21, and at the rear of the box 12, a rear panel member 22 forms the fourth enclosing panel member of the collapsible cap 10.

The rear panel member 22 includes a door 22a hinged at 22b and having a handle 22c, whereby the door may be opened to allow access into the space defined by the cap and box.

The hinged panel members 16 and 20 are joined along the center line of the box 12 by a connector strip 23 that provides a roof line jointing of the collapsible cap 10.

The collapsible cap 10 of the disclosed embodiment may be made of fiberglass for weather resistance, sturdiness and lightweight properties. Other, preferably lightweight, materials may also be used, such as a suitable plastic, as would be understood by those skilled in the art.

In the exemplary embodiment, the front panel member 21 is provided with a window 24 and the door 22a of the rear panel member 22 is provided with a window 25 both of which are preferably made of PLEXIGLAS brand clear plastic. PLEXIGLAS is a trademark believed to be owned by Rohm & Haas Company.

The left side panel 14 and the right side panel 18 are respectively provided with sliding windows 26 and 27, which may be opened from the inside in a conventional construction and which also are preferably made of PLEXIGLAS. It should be appreciated that the windows in the panel members may be omitted to provide a windowless cap if desired.

Turning to FIGS. 6-9, four cross-sectional views of the engagements along the seams between the four panel members forming the collapsible cap 10 and at the box 12 are taken along reference lines AA, BB, CC and DD, as denoted at FIG. 2.

Turning first to FIG. 6, the connector strip 23 is shown in detail. The connector strip 23 provides for a weathertight seal and for the clamping of the left hinged panel member 16 to the right hinged panel member 20 in a secure arrangement. In the disclosed embodiment, the connector strip 23 may be made from an extruded plastic, such as polyethylene, or it may be extruded aluminum. The connector strip 23 is formed to have a slot 28 running substantially the full length of the connector strip 23 with depth sufficient to snugly accommodate the edge of the panel 13 of the left hinged panel member 16. At the opposite side, the connector strip 23 has an elongated slot 29 running for substantially the full length thereof to receive therein the edge of the panel 17 of the right hinged panel member 20. The panel 13 abuts a resilient seal or gasket 30 inside which may be made of synthetic or natural resilient material.

Throughout the collapsible cap 10, a plurality of toggle clamps T are provided to releasably interconnect the four panel members. While toggle clamps are the preferred type of fastener, many others are equally suited to the invention, such as VELCRO brand hook and loop fasteners, mechanical clamps, snap-action fasteners and other fastening means, as would be clear to one skilled in the art. VELCRO is believed to be the registered trademark of Velcro USA Inc. For ease of reference, the toggle clamps T are schematically shown in FIG. 10 illustrating the interconnection of the four panel members, 16, 20, 21, 22 to each other and to the box 12. Each of the toggle clamps T bear the same reference numerals throughout where the features correspond.

In FIG. 6 it will be seen that the toggle clamp T includes a support base 31 which may be affixed to the bottom of the connector strip 23 by suitable fasteners or a suitable adhesive. The toggle clamp T further includes a pivoting clamp arm 32 which pivots on the base 31 at a pivotal connection 33 as the person pulls or pushes against the tapered finger end 34 of the arm 32. A bevel 35 is formed at the opposite end of the arm 32 for allowing pivoting clearance between the arm 32 and the support base 31 during locking and unlocking. A locking bail 36 is pivotally carried by the arm 32 at 36a for locking the toggle clamp T to a catch hook 37, which is affixed to the left hinged panel member 16 also by suitable fasteners or a suitable adhesive.

The toggle clamp T acts in a known manner and pivots about 33 to draw the lock bail 36 and tightly lock the catch hook 37 as pivot 36a of the bail 36 rotates past the pivot 33 or past center to the seated position illustrated.

The edge of the panel 13 of the left hinged panel member 16 is thereby drawn into the slot 28 to tightly abut the resilient seal 30 in a snug fit. The edge of the panel 17 of the right hinged panel member 20 is fixed within the slot 29 by means of a plurality of rivets R spaced apart along the length of the connector strip 23. Other permanent fastenings for example by adhesive bonding, may optionally be used to affix the panel 17 within the slot 29. Throughout the description of collapsible cap 10, rivets R, of a conventional design, are used to secure extruded strips to the panel members.

In the preferred embodiment three toggle clamps T are used for the fastening of the left hinged panel member 16 to the right side cap member 20.

Turning now to FIG. 7, a sectional view of the hinge 19 between top right half panel 17 and right side panel 18 is shown. The hinge 15 at the left side of the collapsible cap 10 is not duplicated in detail because it is a mirror image of the hinge 19.

The hinge 19 fixedly connects the top half panel 17 to the right side panel 18 and includes widened ends 38 and 39 for connections to the panels 17 and 18, respectively. A slot 40 in the widened end 38 receives the panel 17. A slot 41 in the widened end 39 receives the panel 18. The hinge 19 is preferably extruded of a flexible plastic material, such as polyethylene, and is fixed at the opposite widened ends 38 and 39 by means of rivets R extending through the hinge 19 at top panel 17 and side panel 18, respectively, whereby the right hinged panel member 20 has a unitary construction. As a result, the top right half panel 17 may be pivoted, or rotated, to be coplanar with the right side panel 18 for ease of storage in a flattened arrangement. The flexible hinge 19 effectively provides a weathertight seal along this joint. Similarly, the top left half panel 13 may be pivoted to be coplanar with the left side panel 14 for storage in a flat arrangement. The hinged panel members 16 and 20 are easily pivoted by one person when the collapsible cap 10 is to be erected and arranged on the pickup truck box 12.

The side panel 18 of the right hinged panel member 20 is mounted on the box 12 in substantially the same manner as the side panel 14 of the left hinged member 16, and the front panel member 21, as would be understood. A description of the mounting of the panel 18 equally applies to the panel 14 and panel member 21. As depicted in FIG. 7, an extruded elongate connector strip 42 runs along the bottom edge of the right side panel 18. The pickup truck box 12 is defined by four side walls 43 having a rectangular box-like configuration in a known design. A tailgate 43a is provided in the rearmost side wall 43 in a standard arrangement for a pickup truck box. Along the top edge of the side walls 43, but not the tailgate 43a, a resilient sealing gasket 44 is arranged to be disposed between the connector strip 42 and the side walls 43. The rear panel 22 is provided with an overlapping resilient gasket 44a that overlaps the upper outside edge of the tailgate 43a for weatherproofing.

A plurality of eyebolt fasteners 45 form attachment means for securing the collapsible cap 10 to the side walls 43. The eyebolt fasteners 45 are preferably of a conventional design and are thread-engaged into the sidewalls 43 to be permanently premounted thereto. The connector strip 42 includes an elongate slot 46 running substantially the full length thereof for receipt therein of the right side panel 18. The right side panel 18 may be permanently secured within the slot 46 by fasteners, such as rivets, or by a suitable adhesive. The connector strip 42 is fastened over the sealing gasket 44 onto the wall 43. In this latter embodiment, the sealing gasket 44 may be bonded to the undersurface of the connector strip 42 to be storable therewith as a unit. The connector strip 42 is provided with a concave curved base 47 for resting over the resilient sealing gasket and for overlapping the side wall 43 to form a weather resistant tight snug engagement. Slots 48 are provided through the connector strip 42 to positionally correspond to the location of the eyebolt fasteners 45 which extend therethrough interiorly of the collapsible cap 10, as shown. When the left hinged panel member 16, the right hinged panel member 20, and the front panel member 21 are required to be attached to the box 12, the attachments are made by a plurality of toggle clamps T each corresponding to an eyebolt fastener 45 at the locations shown in FIG. 10. For the attachment of the toggle clamp T in FIG. 7, an alternative lock bail 36a is used which has a hooked end rather than the loop shape of the bail 36, as shown in FIG. 6. The hooked end of the lock bail 36a is inserted through the eye of the eyebolt fastener 45 and thereafter the arm 32 is rotated about pivot connection 33 past center to tightly draw the right side panel 18 downwardly. The support base 31 is affixed by fasteners such as rivets or an adhesive to the right side panel 18.

FIG. 8 shows in detail the typical connection of the front panel member 21 to either the left or right hinged panel members 16 or 20. As illustrated in FIG. 8, only the top right half panel 17 of hinged panel member 16 is shown to illustrate the typical attachment. The attachment at the top left half panel 13, left side panel 14, right side panel 18, and the hinges 15 and 19 would be substantially identical.

An L-shaped extruded corner connector strip 49 is formed to join the panel 17 to the front panel member 21 in a weathertight snug arrangement. This strip is flexible at least in the area of the hinges. The connector strip 49 includes a first pair of flanges 50 which form a slot 51 therebetween for the front edge of the panel 17 and which receive a rivet R for affixing the panel 17. A second integral pair of flanges 52 extend generally transversely to the first pair of flanges 50 and form a slot 53 for the receipt of the top edge of the front panel member 21. A resilient sealing gasket 54 resides within the slot 53 for snug sealing arrangement against the top edge of the front panel member 21. A catch hook 37 is affixed to the inside of the second pair of flanges 52 for connection by the toggle clamp T, which is secured at its base 31 to the front wall member 21. It will be observed from FIG. 10 that there are toggle clamps T connecting each of the hinged panel members 16 and 20 to the front panel member 21.

FIG. 9 is a sectional view showing in detail the typical joint connections of the rear panel member 22 to the left and right hinged panel members 16 and 20. To avoid unnecessary duplication, FIG. 9 only shows the connection of the top right half panel 17 of the right hinged member 20, since it will be understood that the connections of the top left half panel 13, left side panel 14, right side panel 18 and the hinges 15 and 19 are substantially identical. The rear panel member 22 is not attached to tailgate 43a but simply overlaps it along the gasket 44a as shown in FIGS. 5 and 10.

An extruded edge piece 55 is provided for substantially the full length of the joint between the left and right hinged panel members 16 and 20 at the rear panel member 22. The extruded edge piece 55 includes a pair of flanges 56 forming a channel 57 therebetween for the receipt therein for the rear edge of top right half panel 17 and is flexible at least along the hinges. Extending inwardly of the collapsible cap 10 a downward portion 58 of the extruded edge piece 55 is formed to have a rearward concave curved seat 59 which terminates at a further cap-inwardly arranged sloped wall 60 for the mounting of the base 31 of a toggle clamp T, as shown. The curved seat 59 will be explained hereinafter in connection with the nested accommodation thereat of a sealing gasket.

Along the top edge of the rear panel member 22 an extruded channel-shaped edge piece 61 is arranged and has a generally downward U-shape. The edge piece 61 includes a pair of flanges 62 forming the U-shape with a slot 63 for the receipt of the top edge of the rear panel member 22. A snap-over elongate bulbous bead 64 is formed along the cap-inward side of the flanges 62 and extends inwardly of the collapsible cap 10 generally in opposition to the curved seat 59 when the collapsible cap 10 is assembled. A resilient seal 65 is attached to the elongate bead 64 and includes a reverse C-shaped portion 66 with the curve of the back of the "C" capable of being seated against the curved portion 59 in a tight snug arrangement. The gap of the C-shaped portion 66 is open at 67 and sized to snap-over and grip the elongate bead 64 for attachment therealong for generally the full length of the joint between edge pieces 55 and 61 thereby forming a tight seal therebetween. The seal 65 further includes an extended flange 68 that extends generally horizontally and tangentially from the curved top of the C-shaped portion 66 to reside between the edge pieces 55 and 61 to provide an additional tight seal therebetween. For this joint connection of the cap 10, the catch hooks 37 for the associated toggle clamps T are affixed to the inward side of the rear panel member 22. In regard to the sectional view shown in FIG. 9, the top edge of the rear panel member 22 is drawn snugly toward the top right half panel 17 to squeeze the seal 65 as the arm 32 of the toggle clamp T is rotated to tighten the lock bail 36 to the catch hook 37. As with the front joint attachment at the front panel member 21, toggle clamps T are provided to connect the rear panel member to the hinged panel members 16 and 20. The edge pieces 55 and 61, are riveted at R to the hinged panel members 16 and 20, and to the rear panel member 22, respectively.

FIGS. 11 and 12 show an alternate embodiment of the connection of a rear panel member to left and right hinged members 16a and 20a. In this alternative, the rear panel member is designated 22A and includes an L-shaped upper end having a right angled extension 69, instead of terminating at the straight top edge shown in FIG. 9. The L-shaped extension 69 includes an edge slot 70 running for the full length thereof and carrying a sealing gasket 71 therein. The slot 70 is sized to receive the left and right top half panels 13a, 17a and the left and right side panels 14a, 18a of the left and right hinged panel members 16a and 20a, respectively. In this typical alternative connection shown in section in FIG. 12, only the left top half panel 13a is shown to avoid needless duplication. Unlike the embodiment of FIG. 9, the hinged panel members 16a and 20a have no corresponding extruded edge piece, such as 55, but rather the top panel 13a fits within the slot 70 directly against the compressible sealing gasket 71.

A toggle, clamp T is mounted generally with its base 31 at the undersurface of the top left half panel 13a to pivot and draw the lock bail 36 against the catch hook 37 which is mounted at the undersurface of the extension 69 of the rear panel member 22A. For this alternative, the catch hooks 37 and bases 31 of the clamps T are substantially co-planar.

The rear panel member 22A includes a rear door 72 having a window 73. The door is pivotally openable such as shown at 25a in FIG. 11. The door 72 includes a pair of conventional hinges 74 along the upper portion and a handle 75 to facilitate pivotally opening it in a conventional manner and to lock the door in a closed position. Thus, the door provides access into the space defined by the cap and box in the same manner as the embodiment of FIG. 1.

It will be clear to those skilled in the art that the sectional cap 10 may be easily assembled and disassembled by one person without the use of any tools once the eyebolts 45 are mounted on the upper edges of the left, right and front sidewalls 43 of the box 12. For example, in assembling the cap 10 the front panel member 21 may be first secured to the front side wall 43 (FIG. 7) and next the right hinged panel member 20 may be mounted by fastening its right side panel 18 to the right side wall 43 (FIG. 7). Thereafter, by pivoting down the top right half panel 17, the connection of the hinged panel member 20 to the front panel member 21 may be made (FIG. 8). The left hinged panel member 16 is next positioned for its left side panel 14 to be connected to the left side wall 43 (FIG. 7) and the front panel member 21 (FIG. 8).

Once the hinged panel members are connected to the box and front panel, they may be connected together by the toggle clamps T along the center connector strip 23.

It will be appreciated that the order of mounting the hinged panel members may be reversed where panel member 20 may be mounted first followed by mounting of panel member 16. Lastly, the rear panel member 22 is mounted on the box and connected by the toggle clamps T to the hinged panel members at the top panels 13 and 17, and the side panels 14 and 18. The cap may be disassembled in the reverse order by first removing the rear panel member 22, the hinged panel members 16 and 20, and finally the front panel 21. The hinged panel members would be straightened so that the top and side panels are coplanar and the hinge is flat, whereby the entire panel member is flat for ease of storage as seen in FIG. 13.

As explained, extruded plastic, such as polyethylene, is utilized in the exemplary embodiment for the manufacture of the connector strips 23, 42, 49 and edge pieces 55, 61. However, metal extrusions are also well suited for use. For example, extruded aluminum could be used. The hinges 15 and 19 are preferably made of flexible plastic in order that the panel members 16 and 20 may be flattened for storage. An extruded metal, for example aluminum, could optionally be substituted wherein a mechanical metal hinge would be provided to achieve the same goal.

In accordance with the invention, it will be apparent that there has been provided a collapsible cap for a pickup truck box that fully satisfies the objects, aims and advantages set forth. While the invention has been described in conjunction with specific embodiments thereof, it will be clear that many alternatives, variations and modifications will be apparent to those skilled in the art in view of the foregoing description. Accordingly, it is intended to embrace all such alternatives, variations and modifications as fall within the spirit and scope of the appended claims.

The invention is hereby claimed as follows:

1. A collapsible cap for a pickup truck box wherein the box includes sidewalls onto which the cap is mounted, said cap comprising:
   interconnectible panel members including front and rear panel members forming the front and rear of the cap, and a pair of intermediate hinged panel members having top and side panel portions thereof for respectively forming the top and sides of the cap, said hinged panel members including front edges mating with the front panel member and rear edges mating with the back panel member;
   manually releasable clamping means for connecting the front and rear panel members to the hinged panel members;
   means between the front and rear panel members and the top and side panel portions of said hinged panel members defining a seal therebetween;
   manually releasable clamping means for connecting the front, and hinged panel members to said sidewalls of the box;
   means between said panel members and said box sidewalls defining a seal therebetween;
   the top panel portions of said hinged panel members extending toward each other to define a seam therebetween, a connecter strip means joining said hinged panel members along said seam, said connector strip means including a channel member secured to one of said top panel portions having a slot facing the other top panel portion to matingly receive the edge portion of said other top panel portion in sealing engagement therewith, manually releasable clamping means for connecting said hinged panel members along said connector strip means; and, said hinged panel members including flexible hinge means connecting said top panel portions to side panel portions thereof to allow said panel portions to be coplanar for storage.

2. The collapsible cap as in claim 1 wherein the front edges of said hinged panel members include edge connector means having a slot for matingly receiving the upper and side edges of the front panel member.

3. The collapsible cap as claimed in claim 2 wherein a compressible sealing gasket is disposed in said slot for effecting sealing engagement with said edges of the front panel member.

4. The collapsible cap as in claim 1 wherein the rear edges of said hinged panel members include an edge connector means therealong for joining with said rear panel member.

5. The collapsible cap as in claim 4 wherein said rear panel member includes a resilient sealing gasket along said upper and side edges and coacting with said edge connector means to define a seal therewith.

6. The collapsible cap as in claim 1 wherein said flexible hinge means comprise extruded plastic strips having opposite ends, one end being fixed to said top panel portion and the other opposite end being fixed to said side panel portion of each hinged panel member.

7. The collapsible cap as in claim 1 wherein said side panel portions of the hinged panel members and said front panel member include lower edges, said lower edges having edge strips engaged therealong, the edge strips having a concave bottom surface thereof for resting atop the side walls of a pickup truck box.

8. The collapsible cap as in claim 7 wherein a sealing gasket is arranged underneath the concave bottom surface of said edge strips for sealing atop the side walls of a pickup truck box.

9. The collapsible cap as in claim 1 wherein said releasable clamping means at the panel members and said box side walls comprise toggle clamps coacting with eyebolts and being manually pivotable to lock and unlock.

10. The collapsible cap as in claim 1 wherein said rear panel member includes an L-shaped top and side edges having an inwardly directed extension, said extension terminating in a slot means, said slot means receiving rear edges of said hinged panel members therein.

11. The collapsible cap as in claim 10 wherein said slot means includes a compressible gasket therein whereby said gasket is compressed by the fastening of the releasable fastening means associated therewith.

12. A sectional cap for a pickup truck box having a bottom wall, front and back walls and opposed side walls, said cap comprising, a front panel adapted to align with and extend upwardly from the front wall, a rear panel adapted to align with and extend upwardly from said back wall, and a pair of intermediate panel members extending between said front and rear panels and each of which includes side panels adapted to align with and extend upwardly from said side walls and top panels extending inwardly from and at substantially right angles to the upper ends of said side panels and into connecting relation, hinge means interconnecting said side and top panels whereby said intermediate panel members may be stored flat with the side and top panels in substantially coplanar relation, means sealing the connecting top panels, means sealing between said intermediate panel members and said front and rear panels, releasable fastening means connecting said top panels together, the intermediate panel members to the front and rear panels and the front panel and side panels respectively to the front wall and side walls of said box, and a door in said rear panel, said door having means for sealing with said rear wall when in closed position, whereby the front panel, rear panel and intermediate panel members of said cap may be easily assembled and mounted on said box or disassembled and stored.

* * * * *